United States Patent
Yoshida et al.

(10) Patent No.: US 9,276,263 B2
(45) Date of Patent: Mar. 1, 2016

(54) ALL-SOLID STATE SECONDARY CELL

(75) Inventors: Naoki Yoshida, Tokyo (JP); Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 172 days.

(21) Appl. No.: 14/126,718

(22) PCT Filed: Jun. 11, 2012

(86) PCT No.: PCT/JP2012/064914
§ 371 (c)(1),
(2), (4) Date: Dec. 16, 2013

(87) PCT Pub. No.: WO2012/173089
PCT Pub. Date: Dec. 20, 2012

(65) Prior Publication Data
US 2014/0127579 A1 May 8, 2014

(30) Foreign Application Priority Data
Jun. 17, 2011 (JP) .................. 2011-135292

(51) Int. Cl.
*H01M 4/62* (2006.01)
*H01M 10/0562* (2010.01)
*H01B 1/12* (2006.01)

(52) U.S. Cl.
CPC ............... *H01M 4/622* (2013.01); *H01B 1/122* (2013.01); *H01M 4/621* (2013.01); *H01M 10/0562* (2013.01)

(58) Field of Classification Search
USPC ....................................................... 427/217
See application file for complete search history.

(56) References Cited

U.S. PATENT DOCUMENTS

| 7,052,629 B2 * | 5/2006 | Maeda .................. H01M 4/622 252/182.1 |
| 2006/0257739 A1 | 11/2006 | Ryu et al. |
| 2006/0275661 A1 | 12/2006 | Kim et al. |
| 2008/0131776 A1 | 6/2008 | Sakuma et al. |
| 2009/0081553 A1 | 3/2009 | Kondo et al. |
| 2009/0325069 A1 * | 12/2009 | Anada .................. C09J 123/147 429/217 |
| 2012/0330589 A1 | 12/2012 | Ryu et al. |

FOREIGN PATENT DOCUMENTS

| JP | 2005-166756 A | 6/2005 | |
| JP | 2008-537841 A | 9/2008 | |
| JP | 2008-546135 A | 12/2008 | |
| JP | 2009-80999 A | 4/2009 | |
| JP | 2009-176484 A | 8/2009 | |
| JP | 2009176484 A * | 8/2009 | ............. H01M 4/02 |
| JP | 2011-76981 A | 4/2011 | |
| WO | WO 2006/080259 A1 | 8/2006 | |

OTHER PUBLICATIONS

International Search Report, mailed Aug. 7, 2012, issued in PCT/JP2012/064914.

\* cited by examiner

*Primary Examiner* — Vu A Nguyen
(74) *Attorney, Agent, or Firm* — Birch, Stewart, Kolasch & Birch, LLP

(57) ABSTRACT

An all-solid state secondary cell which has a positive electrode active material layer, negative electrode active material layer, and solid electrolyte layer, wherein at least one of said positive electrode active material layer, said negative electrode active material layer, and said solid electrolyte layer includes an inorganic solid electrolyte and a binder comprised of an average particle size 30 to 300 nm particulate-shaped polymer and said particulate-shaped polymer is present in said positive electrode active material layer, said negative electrode active material layer, and said solid electrolyte layer in a state holding the particulate state, is provided.

7 Claims, No Drawings

ALL-SOLID STATE SECONDARY CELL

TECHNICAL FIELD

The present invention relates to an all solid-state lithium ion secondary cell or other all-solid state secondary cell.

BACKGROUND ART

In recent years, demand for lithium secondary cells and other secondary cells has been increasing for portable information terminals, portable electronic devices, and other portable terminals and also various other applications such as small-size power storage devices for household use, two-wheel motor vehicles, electric vehicles, hybrid electric vehicles, etc. Along with the growth in applications, further improvements in safety of secondary cells is being demanded. To secure safety, the method of preventing leakage of liquids and the method of using solid electrolytes instead of organic solvent electrolytes—which are highly flammable and are high in risk of causing fires when leaking—are effective.

For example, Patent Document 1 discloses an all-solid state secondary cell which is configured by using a solid electrolyte constituted by sulfide glass and/or sulfide glass ceramic comprised of $Li_2S$ and $P_2S_5$.

PRIOR ART DOCUMENTS

Patent Documents

Patent Document 1: Japanese Patent Publication No. 2009-176484A

DISCLOSURE OF THE INVENTION

Problem to be Solved by the Invention

However, in the above Patent Document 1, as the binder for holding the solid electrolyte, a thermoplastic elastomer or resin which has an ethyleneoxide structure is used, so there is the problem that the binder ends up covering the solid electrolyte, electronic conduction is inhibited by this, and the internal resistance ends up becoming higher when used for an all-solid state secondary cell.

The present invention has as its object the provision of an all-solid state secondary cell which has an excellent rate characteristics and charging/discharging cycle characteristics. Further, the present invention also has as its object the provision of an all-solid state secondary cell-use slurry which is used for producing such an all-solid state secondary cell.

Means for Solving the Problems

The inventors engaged in in-depth research so as to achieve the above object and as a result discovered that by using an inorganic solid electrolyte and a binder which is comprised of an average particle size 30 to 300 nm particulate-shaped polymer in combination and providing that particulate-shaped polymer in an all-solid state secondary cell in a state holding the particulate state, it is possible to obtain an all-solid state secondary cell which has an excellent rate characteristics and charging/discharging cycle characteristics and thereby completed the present invention.

That is, according to the present invention, there is provided an all-solid state secondary cell which has a positive electrode active material layer, negative electrode active material layer, and solid electrolyte layer, wherein at least one of the positive electrode active material layer, the negative electrode active material layer, and the solid electrolyte layer includes an inorganic solid electrolyte and a binder comprised of an average particle size 30 to 300 nm particulate-shaped polymer and the particulate-shaped polymer is present in the positive electrode active material layer, the negative electrode active material layer, and the solid electrolyte layer in a state holding the particulate state.

In the all-solid state secondary cell of the present invention, preferably the particulate-shaped polymer has a core-shell structure.

In the all-solid state secondary cell of the present invention, preferably the shell part of the particulate-shaped polymer is comprised of a polymer which has (meth)acrylic acid ester monomer units containing an ethyleneoxide structure.

In the all-solid state secondary cell of the present invention, preferably the core part of the particulate-shaped polymer is comprised of a polymer which has cross-linkable monomer units.

In the all-solid state secondary cell of the present invention, preferably the ratio of the core part and shell part of the particulate-shaped polymer is, by weight ratio of "core part: shell part", 70:30 to 10:90.

In the all-solid state secondary cell of the present invention, preferably a difference ($Tg_c$–$Tg_s$) between a glass transition temperature ($Tg_c$) of the core part of the particulate-shaped polymer and a glass transition temperature ($Tg_s$) of the shell parts is 30° C. or more.

In the all-solid state secondary cell of the present invention, preferably the inorganic solid electrolyte is sulfide glass which contains Li, P, and S and/or a sulfide glass ceramic which contains Li, P, and S.

Further, according to the present invention, there is provided an all-solid state secondary cell-use slurry obtained by dissolving or dispersing an inorganic solid electrolyte and a binder comprised of an average particle size 30 to 300 nm particulate-shaped polymer in a nonpolar solvent which has a boiling point of 100 to 220° C. In the all-solid state secondary cell-use slurry of the present invention, preferably the nonpolar solvent has an SP value of 14 to 20 $MPa^{1/2}$.

Effects of the Invention

According to the present invention, an all-solid state secondary cell which has an excellent rate characteristics and charging/discharging cycle characteristics and an all-solid state secondary cell-use slurry for producing such an all-solid state secondary cell can be provided.

DESCRIPTION OF EMBODIMENTS

The all-solid state secondary cell of the present invention has a positive electrode active material layer, negative electrode active material layer, and solid electrolyte layer, wherein at least one of the positive electrode active material layer, the negative electrode active material layer, and the solid electrolyte layer includes an inorganic solid electrolyte and a binder comprised of an average particle size 30 to 300 nm particulate-shaped polymer and the particulate-shaped polymer is present in the positive electrode active material layer, the negative electrode active material layer, and the solid electrolyte layer in a state holding the particulate state.

(Inorganic Solid Electrolyte)

First, the inorganic solid electrolyte w used in the present invention will be explained.

The inorganic solid electrolyte is not particularly limited so long as it is one which has conductivity of lithium ions. Sulfide glass which contains Li, P, and S, a sulfide glass ceramic which contains Li, P, and S, Li$_3$N, LISICON (Li$_{14}$Zn (GeO$_4$)$_4$), perovskite type Li$_{0.5}$La$_{0.5}$TiO$_3$, LIPON (Li$_{3+y}$PO$_{4-x}$N$_x$), Thio-LISICON (Li$_{3.25}$Ge$_{0.25}$P$_{0.75}$S$_4$), and other crystalline inorganic lithium ion conductors etc. may be mentioned. Among these, sulfide glass which contains Li, P, and S and/or a sulfide glass ceramic which contains Li, P, and S are preferable.

Sulfide glass which contains Li, P, and S (below, suitably referred to as "Li—P—S-based glass") is glass which contains Li$_2$S and P$_2$S$_5$ and can be produced by mixing Li$_2$S and P$_2$S$_5$ in a predetermined ratio. Further, a sulfide glass ceramic which contains Li, P, and S suitably referred to as "Li—P—S-based glass ceramic") is a glass ceramic which contains Li$_2$S and P$_2$S$_5$ and can be produced by mixing Li$_2$S and P$_2$S$_5$ in a predetermined ratio to obtain Li—P—S-based glass and firing it at 150 to 360° C.

In the Li—P—S-based glass and Li—P—S-based glass ceramic, the ratio of Li$_2$S and P$_2$S$_5$ is, by molar ratio of Li$_2$S:P$_2$S$_5$, preferably 65:35 to 75:25, more preferably 68:32 to 74:26. By making the ratio of Li$_2$S and P$_2$S$_5$ this range, it is possible to make the lithium ion conductivity high. Specifically, it is possible to make the lithium ion conductivity preferably $1\times10^{-4}$ S/cm or more, more preferably $1\times10^{-3}$ S/cm or more.

Note that, the Li—P—S-based glass and Li—P—S-based glass ceramic may contain, in a range not causing a drop in the ion conductivity, at least one type of sulfide which is selected from the group comprised of Al$_2$S$_3$, B$_2$S$_3$, and SiS$_2$ and at least one type of lithium ortho-oxosalt which is selected from the group comprised of Li$_3$PO$_4$, Li$_4$SiO$_4$, Li$_4$GeO$_4$, Li$_3$BO$_3$, and Li$_3$AlO$_3$. By including such a sulfide or lithium ortho-oxosalt, it is possible to stabilize the glass ingredient in the Li—P—S-based glass and Li—P—S-based glass ceramic.

Further, the Li—P—S-based glass and Li—P—S-based glass ceramic has an average particle size of preferably 0.1 to 50 μm, more preferably 0.1 to 20 μm. If the average particle size is too small, handling is liable to become difficult. On the other hand, if the average particle size is too large, the dispersibility is liable to deteriorate.

(Binder)

Next, the binder used in the present invention will be explained.

The binder used in the present invention is an average particle size 30 to 300 nm particulate-shaped polymer. The particulate-shaped polymer may be one which can remain present in the all-solid state secondary cell in a state holding the particulate state, that is, one which can remain present on the inorganic solid electrolyte particles, on the positive electrode active marerial particles, and/or on negative electrode active material particles in a state holding the particulate state, but one which has a core-shell structure is preferable.

Note that, in the present invention, "state holding the particulate state" does not have to be the state completely holding the particulate shape. It need only be a state holding the particulate shape to a certain extent. For example, as a result that it makes the inorganic solid electrolyte particles bonded together (alternatively, positive electrode active material particles bonded together and negative electrode active material particles bonded together together), it may be a shape which is pressed in a certain extent by force being given by these particles.

In the present invention, when making the particulate-shaped polymer one which has a core-shell structure, the core part is preferable comprised of a polymer which has cross-linkable monomer units.

As the cross-linkable monomer which forms the cross-linkable monomer units comprised of the polymer which forms the core part, divinylbenzene, divinylnaphthalene, and their derivatives and other aromatic divinyl compounds; acryl methacrylate, ethyleneglycol dimethacrylate, diethyleneglycol dimethacrylate, and other ethylenically unsaturated carboxylic acid esters; N,N-divinylaniline, divinylether, and other divinyl compounds; compounds which have three or more vinyl groups, etc. may be mentioned. These cross-linkable monomers may be used alone or in combinations of two or more types. Among these, divinylbenzene and acryl methacrylate are preferable and divinylbenzene is more preferable. The ratio of content of the cross-linkable monomer units in the polymer which forms the core part is preferably 0.1 to 10 wt %, more preferably 0.3 to 7 wt %, furthermore preferably 0.5 to 4 wt %. Further, the ratio of content of the cross-linkable monomer units in the particulate-shaped polymer (ratio of content with respect to the particulate-shaped polymer which contains a core part and shell part as a whole) is preferably 0.01 to 15 wt %, more preferably 0.05 to 10 wt %, furthermore preferably 0.1 to 5 wt %. If the ratio of content of the cross-linkable monomer units is too low, the strength of the particulate-shaped polymer is liable to end up falling. On the other hand, if too high, sometimes the core-shell structure cannot be formed well.

Further, the polymer which forms the core part may contain, in addition to the cross-linkable monomer units, other monomer units which can copolymerize with the cross-linkable monomer. As the other copolymerizable monomer, styrene; vinyltoluene, α-methylstyrene, or other styrene derivatives; acrylic acid, methacrylic acid; methyl acrylate, ethyl acrylate, propyl acrylate, butyl acrylate, 2-ethylhexyl acrylate, dimethylaminoethyl acrylate, or other acrylic acid ester; methyl methacrylate, ethyl methacrylate, propyl methacrylate, butyl methacrylate, 2-ethylhexyl methacrylate, dimethylaminoethyl methacrylate, or other methacrylic acid esters; acrylamide, methacrylamide, or other amide compounds; ethylene, propylene, butylene, or other olefins; etc. may be mentioned. These other copolymerizable monomers may be used alone or in combinations of two or more types. In the polymer which forms the core part, the ratio of content of the other copolymerizable monomer units is preferably 90 to 99.9 wt %, more preferably 93 to 99.7 wt %, furthermore preferably 96 to 99.5 wt %.

Furthermore, when making the particulate-shaped polymer one which has a core-shell structure, the shell part is preferably one comprised of a polymer which has the (meth) acrylic acid ester monomer units (meaning acrylic acid ester monomer units and/or methacrylic acid ester monomer units, same below) containing an ethyleneoxide structure. By incuding the (meth)acrylic acid ester monomer units which contains an ethyleneoxide structure in shell part, the lithium ion conductivity can be improved. Note that, an "ethyleneoxide structure" is a polymerization unit of ethyleneoxide and is sometimes called an "oxyethylene structure". As the (meth) acrylic acid ester monomer units containing an ethyleneoxide structure which form the (meth)acrylic acid ester monomer units containing an ethyleneoxide structure, polyethyleneglycol (meth)acrylate, methoxypolyethyleneglycol (meth) acrylate, ethoxypolyethyleneglycol (meth)acrylate, phenoxypolyethyleneglycol (meth)acrylate, nonylphenoxypolyethyleneglycol (meth)acrylate, diethyleneglycol (meth)acrylate, methoxydiethyleneglycol (meth)

acrylate, ethoxydiethyleneglycol (meth)acrylate, polyethyleneglycol di(meth)acrylate, etc. may be mentioned. These (meth)acrylic acid ester monomer units containing an ethyleneoxide structure may be used alone or in combinations of two or more types. In the polymer which forms the shell part, the ratio of content of the (meth)acrylic acid ester monomer units containing an ethyleneoxide structure is preferably 30 to 100 wt %, more preferably 40 to 100 wt %. If the ratio of content of the (meth)acrylic acid ester monomer units containing an ethyleneoxide structure is too small, the effect of improvement of the lithium ion conductivity becomes difficult to obtain.

Further, the polymer which forms the shell part may contain, in addition to the (meth)acrylic acid ester monomer units containing an ethyleneoxide structure, other monomer units which can copolymerize with the (meth)acrylic acid ester monomer containing an ethyleneoxide structure. As the other copolymerizable monomer, one similar to the above-mentioned core part can be used. Further, in the polymer which forms the shell part, the ratio of content of the other copolymerizable monomer units is preferably 70 wt % or less, more preferably 60 wt % or less.

In the present invention, by making the particulate-shaped polymer one which has a core-shell structure, making the core part one comprised of a polymer which has cross-linkable monomer units, and making the shell part one comprised of a polymer which has (meth)acrylic acid ester monomer units containing an ethyleneoxide structure, it is possible to make the binding force as the binder excellent while holding a high strength. Due to this, the obtained all-solid state secondary cell can be more improved in rate characteristics and charging/discharging cycle characteristics.

When making the particulate-shaped polymer one which has a core-shell structure, the ratio of the core part and the shell part is, by weight ratio of core part:shell part, preferably 70:30 to 10:90, more preferably 60:40 to 15:85, furthermore preferably 50:50 to 20:80. If the ratio of the core part is too low, the strength is liable to fall, while if the ratio of the shell part is too low, the binding force as the binder is liable to fall.

When making the particulate-shaped polymer one which has a core-shell structure, the difference ($Tg_c-Tg_s$) of the glass transition temperature between the glass transition temperature ($Tg_c$) of the core part and the glass transition temperature ($Tg_s$) of the shell part is preferably 30° C. or more, more preferably 50° C. or more. Further, the glass transition temperature ($Tg_c$) of the core part is preferably 30 to 220° C., more preferably 40 to 210° C., furthermore preferably 50 to 200° C. If the difference ($Tg_c-Tg_s$) of the glass transition temperature is too small, the binding force as the binder is liable to fall. Note that, the upper limit of the difference ($Tg_c-Tg_s$) of the glass transition temperature is not particularly set, but is usually 180° C.

Further, the particulate-shaped polymer has an average particle size of 30 to 300 nm, preferably 50 to 250 nm, furthermore preferably 70 to 200 nm. If the average particle size of the particulate-shaped polymer is too small, the stability when made into a slurry is liable to deteriorate. On the other hand, if the average particle size is too large, when binding the inorganic solid electrolyte particles together (alternatively, the positive electrode active material particles together or the negative electrode active material particles together), the distance between these particles ends up becoming greater and the internal resistance when made into an all-solid state secondary cell is liable to end up becoming higher. Note that, the average particle size of the particulate-shaped polymer can, for example, be controlled by adjusting the type and amount of addition of used emulsifier when producing the particulate-shaped polymer by emulsion polymerization. Further, the average particle size of the particulate-shaped polymer can be measured, for example, by a method using a laser diffraction type particle size distribution measuring apparatus.

When making the particulate-shaped polymer one which has a core-shell structure, as the method of producing the particulate-shaped polymer, the method of first polymerizing the monomer for core by the emulsion polymerization method using water as a dispersant etc., using the obtained polymer as seed particles, and polymerizing the monomer for shell by the emulsion polymerization method using water as a dispersant etc. is simple and preferable. In this case, it is possible to use the same reactor to polymerize the monomer for core, then add and polymerize the monomer for shell to form a core-shell structure. Alternatively, it is possible to use seed particles which were formed in a separator reactor as the core and use another reactor to polymerize the monomer for shell so as to form a core-shell structure.

The polymerization conversion rate in the polymerization reaction of the monomer for core is usually 70 wt % or more, preferably 90 wt % or more. If the polymerization conversion rate is too low, formation of a core-shell structure becomes difficult. Note that, as the method of adding a monomer for shell, the method of adding and polymerizing the entire amount all together, the method of adding and polymerizing part of the monomer and adding the remainder continuously or intermittently; alternatively the method of adding the monomer continuously from the start of the polymerization reaction of the shell part, etc. may be mentioned. Further, the polymerization conversion rate in the polymerization reaction of the monomer for shell is usually 70 wt % or more, preferably 90 wt % or more. The polymerization temperature, for both polymerization of the core part and polymerization of the shell part, is usually 30 to 90° C., preferably 40 to 80° C., while the polymerization time is in each case usually 0.5 to 10 hours, preferably 1 to 8 hours.

Note that, when polymerizing the particulate-shaped polymer by emulsion polymerization using water as a dispersant and obtaining the result as an aqueous dispersion, it is preferable to treat the obtained aqueous dispersion of the particulate-shaped polymer by solvent displacement by a nonpolar solvent with a boiling point of 100 to 220° C. to obtain a solution or dispersion of a nonpolar solvent with a boiling point of 100 to 220° C. By solvent displacement by a nonpolar solvent with a boiling point of 100 to 220° C., it is possible to efficiently remove moisture by heating and drying in the production process and thereby possible to reduce the amount of moisture when making the all-solid state secondary cell. Note that, as the nonpolar solvent which is used for solvent displacement, one with a boiling point of 100 to 220° C. is preferable, the boiling point is preferably 120 to 210° C., more preferably 140 to 200° C. If using a nonpolar solvent with a boiling point which is too low, removal of the moisture in the production process is liable to become difficult. On the other hand, if using a nonpolar solvent with a boiling point which is too high, too much time is liable to be taken for heating and drying in the production process.

Further, the nonpolar solvent which is used for solvent displacement is preferably one with an SP value (solubility parameter) of 14 to 20 $MPa^{1/2}$, more preferably 15 to 19 $MPa^{1/2}$, furthermore preferably 16 to 18 $MPa^{1/2}$. If using a nonpolar solvent with an SP value which is too low, the dispersibiity of the polymer particles is liable to fall. On the other hand, if using a nonpolar solvent with an SP value which is too high, the nonpolar solvent easily reacts with the inorganic solid electrolyte and is liable to have a detrimental effect on the characteristics of the obtained all-solid state secondary cell.

As specific examples of the nonpolar solvent which is used in such solvent displacement, n-octane (boiling point 125° C., SP value 15.6), isooctane (boiling point 117° C., SP value 14.1), toluene (boiling point 111° C., SP value 18.2), o-xylene (boiling point 144° C., SP value 18.5), m-xylene (boiling point 139° C., SP value 18.0), p-xylene (boiling point 138° C., SP value 18.0), styrene (boiling point 145° C., SP value 19.0), ethylbenzene (boiling point 136° C., SP value 18.0), decalin (boiling point 185° C., SP value 18.0), etc. may be mentioned.

(Solid Electrolyte Layer)

The solid electrolyte layer which forms part of the all-solid state secondary cell of the present invention is one which contains a solid electrolyte. In the present invention, as the solid electrolyte layer, one which contains the above-mentioned inorganic solid electrolyte and the above-mentioned binder constituted by a particulate-shaped polymer is preferable. By configuration in this way, the obtained all-solid state secondary cell can be made one which is excellent in rate characteristics and charging/discharging cycle characteristics.

The content of the particulate-shaped polymer in the solid electrolyte layer is preferably 0.05 to 8 parts by weight with respect to 100 parts by weight of the inorganic solid electrolyte, more preferably 0.1 to 6 parts by weight, furthermore preferably 0.2 to 4 parts by weight. If the content of the particulate-shaped polymer is too small, the binding force in the solid electrolyte layer ends up falling and the charging/discharging cycle characteristics is liable to fall. On the other hand, if the content is too large, the internal resistance of the obtained all-solid state secondary cell is liable to become higher.

As the method of forming the solid electrolyte layer, the method of preparing a solid electrolyte layer slurry which contains an inorganic solid electrolyte, particulate-shaped polymer, and organic solvent, then coating the prepared solid electrolyte layer slurry on a base material and drying it etc. may be mentioned.

Note that, as the particulate-shaped polymer, as mentioned above, it is preferable to use a solution or dispersion of the polymer which is dissolved or dispersed in a nonpolar solvent with a boiling point of 100 to 220° C. In this case, as the organic solvent which is contained in the solid electrolyte layer slurry, it is preferable to use the above-mentioned nonpolar solvent with a boiling point of 100 to 220° C. That is, it is preferable to make the solid electrolyte layer slurry one which contains an inorganic solid electrolyte, particulate-shaped polymer, and nonpolar solvent with a boiling point of 100 to 220° C.

When preparing a solid electrolyte layer slurry, the method of mixing the above-mentioned ingredients is not particular limited, but for example the method of using a homogenizer, ball mill, beads mill, planetary mixer, sand mill, roll mill, planetary stirrer, or other dispersing or mixing device may be mentioned. The method of using a planetary mixer, ball mill, or beads mill is preferable from the viewpoint of being able to suppress aggregation of the inorganic solid electrolyte.

The content of the nonpolar solvent with a boiling point of 100 to 220° C. in the solid electrolyte layer slurry is preferably 5 to 70 parts by weight with respect to 100 parts by weight of the inorganic solid electrolyte, more preferably 10 to 60 parts by weight, furthermore preferably 20 to 50 parts by weight. If the content of the nonpolar solvent is too small, it sometimes becomes difficult to form a film with the desired thickness. On the other hand, if the content is too large, removal of the solvent is liable to take time.

Further, the solid electrolyte layer slurry may contain, in addition to the above ingredients, a dispersant, leveling agent, defoamer, or other ingredients. These are not particularly limited so as not to have any effect on the cell reaction.

As the dispersant, an anionic compound, cationic compound, nonionic compound, and polymer compound may be illustrated. The content of the dispersant in the solid electrolyte layer slurry is preferably in a range not affecting the cell characteristics. Specifically, 10 parts by weight or less with respect to 100 parts by weight of the inorganic solid electrolyte is preferable.

As the leveling agent, an alkyl-based surfactant, silicone-based surfactant, fluorine-based surfactant, metal-based surfactant, or other surfactant may be mentioned. By including the leveling agent, when coating the solid electrolyte layer slurry on the surface of the positive electrode active material layer or negative electrode active material layer, it is possible to prevent cissing. The content of the leveling agent in the solid electrolyte layer slurry is preferably in a range not affecting the cell characteristics. Specifically, making it 10 parts by weight or less with respect to 100 parts by weight of the inorganic solid electrolyte is preferable.

As the defoamer, a mineral oil-based defoamer, silicone-based defoamer, polymer-based defoamer, etc. may be mentioned. The content of the leveling agent in the solid electrolyte layer slurry is preferably in a range not affecting the cell characteristics. Specifically, making it 10 parts by weight or less with respect to 100 parts by weight of the inorganic solid electrolyte is preferable.

(Positive Electrode Active Material Layer)

The positive electrode active material layer forming part of the all-solid state secondary cell of the present invention is one which contains a positive electrode active material. In the present invention, as the positive electrode active material layer, one which contains, in addition to the positive electrode active material, the above-mentioned inorganic solid electrolyte and the above-mentioned binder constituted by a particulate-shaped polymer is preferable. By configuring the layer in this way, the obtained all-solid state secondary cell can be made one which is excellent in rate characteristics and charging/discharging cycle characteristics.

The positive electrode active material is a compound which can store and release lithium ions. Positive electrode active material s can be roughly divided into ones which are comprised of inorganic compounds and ones which are comprised of organic compounds.

As positive electrode active materials which are comprised of inorganic compounds, transition metal oxides, composite oxides of lithium and transition metals, transition metal sulfides, etc. may be mentioned. As transition metals, for example, Fe, Co, Ni, Mn, etc. may be mentioned. As specific examples of positive electrode active materials which are comprised of inorganic compounds, $LiCoO_2$, $LiNiO_2$, $LiMnO_2$, $LiMn_2O_4$, $LiFePO_4$, $LiFeVO_4$, and other lithium-containing composite metal oxides; $TiS_2$, $TiS_3$, amorphous $MoS_2$, or other transition metal sulfides; $Cu_2V_2O_3$, amorphous $V_2O$—$P_2O_5$, $MoO_3$, $V_2O_5$, $V_6O_{13}$, and other transition metal oxides; etc. may be mentioned. These compounds may be partially substituted in elements.

As the positive electrode active materials which are comprised of organic compounds, for example, polyaniline, polypyrrole, polyacene, disulfide-based compounds, polysulfide-based compounds, N-fluoropyridinium salts, etc. may be mentioned. Further, the positive electrode active materials may also be mixtures of the above-mentioned inorganic compounds and organic compounds.

The average particle size of the positive electrode active material is preferably 0.1 to 50 µm, more preferably 1 to 20 µm, from the viewpoint of improving the rate characteristics, charging/discharging cycle characteristics, and other characteristics of cell. If the average particle size is in the above range, it is possible to increase the charging/discharging capacity of the obtained all-solid state secondary cell and handling when producing the positive electrode active material layer becomes easy. Note that, the average particle size of the positive electrode active material can be found by measuring the particle size distribution by laser diffraction.

The content of the inorganic solid electrolyte in the positive electrode active material layer is preferably 5 to 95 parts by weight with respect to 100 parts by weight of the positive electrode active material, more preferably 10 to 90 parts by weight, furthermore preferably 20 to 80 parts by weight. If the content of the inorganic solid electrolyte is too small, the ion conductivity in the positive electrode active material layer becomes insufficient, the positive electrode active material is not effectively utilized, and the obtained all-solid state secondary cell is liable to end up falling in capacity.

The content of the particulate-shaped polymer in the positive electrode active material layer is preferably 0.1 to 10 parts by weight with respect to 100 parts by weight of the total of the positive electrode active material and inorganic solid electrolyte, more preferably 0.5 to 8 parts by weight, furthermore preferably 1 to 5 parts by weight. If the content of the particulate-shaped polymer is too small, the binding force in the positive electrode active material layer ends up falling and the obtained all-solid state secondary cell is liable to fall in charging/discharging cycle characteristics. On the other hand, if the content is too large, the obtained all-solid state secondary cell is liable to rise in internal resistance.

Further, the positive electrode active material layer may further contain, in addition to the above ingredients, a conductivity imparting material, reinforcing material, dispersant, leveling agent, antioxidant, thickening agent, electrolyte breakdown inhibitor, or other ingredients.

As the conductivity imparting material, acetylene black, ketjen black, carbon black, graphite, or other conductive carbon, various metal fibers or foils etc. may be mentioned. By having the positive electrode active material layer contain a conductivity imparting material, the obtained all-solid state secondary cell can be improved in rate characteristics. The content of the conductivity imparting material in the positive electrode active material layer is preferably 0.01 to 20 parts by weight with respect to 100 parts by weight of the positive electrode active material, more preferably 1 to 10 parts by weight.

As the method of forming the positive electrode active material layer, the method of preparing a positive electrode active material layer slurry which contains a positive electrode active material, inorganic solid electrolyte, particulate-shaped polymer, and organic solvent and a conductivity imparting material or other ingredient which is added according to need, then coating the prepared positive electrode active material layer slurry on the current collector and drying it etc. may be mentioned.

Note that, as the particulate-shaped polymer, as explained above, it is preferable to use a solution or dispersion of the polymer which is dissolved or dispersed in a nonpolar solvent with a boiling point of 100 to 220° C. In this case, as the organic solvent which is contained in the positive electrode active material layer slurry, it is preferable to use the above-mentioned nonpolar solvent with a boiling point of 100 to 220° C. That is, the positive electrode active material layer slurry is preferably made one which contains a positive electrode active material, inorganic solid electrolyte, particulate-shaped polymer, and nonpolar solvent with a boiling point of 100 to 220° C. and conductivity imparting material or other ingredient which is added in accordance with need.

When preparing the positive electrode active material layer slurry, the method of mixing the above-mentioned ingredients is not particularly limited, but for example the method of using a homogenizer, ball mill, beads mill, planetary mixer, sand mill, roll mill, planetary mixer, or other dispersing or mixing device may be mentioned. The method of using a planetary stirrer, ball mill, or beads mill is preferable from the viewpoint of being able to suppress aggregation of the positive electrode active material and inorganic solid electrolyte.

The content of the nonpolar solvent with a boiling point of 100 to 220° C. in the positive electrode active material layer slurry is preferably 5 to 70 parts by weight with respect to 100 parts by weight of the total of the positive electrode active material and inorganic solid electrolyte, more preferably 10 to 60 parts by weight, furthermore preferably 20 to 50 parts by weight. If the content of the nonpolar solvent is too small, it sometimes becomes difficult to form a film by a desired thickness. On the other hand, if too large, removal of the solvent is liable to take time.

Further, the positive electrode active material layer slurry may contain, in addition to the above ingredients, like the above-mentioned solid electrolyte layer slurry, a dispersant, leveling agent, defoamer, or other ingredients. These are not particularly limited so long as not affecting the cell reaction.

(Negative Electrode Active Material Layer)

The negative electrode active material layer which forms part of the all-solid state secondary cell of the present invention is one which contains a negative electrode active material. In the present invention, as the negative electrode active material layer, one which contains, in addition to the negative electrode active material, the above-mentioned inorganic solid electrolyte and the above-mentioned binder constituted by a particulate-shaped polymer is preferable. By configured in this way, the obtained all-solid state secondary cell can be made one excellent in rate characteristics and charging/discharging cycle characteristics.

The negative electrode active material used may be amorphous carbon, graphite, natural graphite, mesocarbon microbeads, pitch-based carbon fibers, and other carbonaceous materials; polyacene or other conductive polymers; silicon, tin, zinc, manganese, iron, nickel, or other metals and their alloys; oxides or sulfates of the metals or alloys; metal lithium; Li—Al, Li—Bi—Cd, Li—Sn—Cd, or other lithium alloys; lithium transition metal nitrides; silicon; etc. may be mentioned. Further, in the present invention, as the negative electrode active material, it is also possible to use one with a conductivity imparting material deposited on its surface by a mechanical reforming method.

The average particle size of the negative electrode active material is preferably 1 to 50 µm, more preferably 15 to 30 µm, from the viewpoint of the initial charging/discharging efficiency, rate characteristics, charging/discharging cycle characteristics, and other characteristics of cell. If the average particle size is in the above range, it is possible to increase the charging/discharging capacity of the obtained all-solid state secondary cell and handling when producing the negative electrode active material layer becomes easy. Note that, the average particle size of the negative electrode active material can be found by measuring the particle size distribution by laser diffraction.

The content of the inorganic solid electrolyte in the negative electrode active material layer is preferably 5 to 95 parts by weight with respect to 100 parts by weight of the negative electrode active material, more preferably 10 to 90 parts by weight, furthermore preferably 20 to 80 parts by weight. If the content of the inorganic solid electrolyte is too small, the ion conductivity in the negative electrode active material layer becomes insufficient, the negative electrode active material is not effectively utilized, and the obtained all-solid state secondary cell is liable to end up falling in capacity.

The content of the particulate-shaped polymer in the negative electrode active material layer is preferably 0.1 to 10 parts by weight with respect to 100 parts by weight of the total of the negative electrode active material and inorganic solid electrolyte, more preferably 0.5 to 8 parts by weight, furthermore preferably 1 to 5 parts by weight. If the content of the particulate-shaped polymer is too small, the binding force in the negative electrode active material layer ends up falling and the obtained all-solid state secondary cell is liable to fall in charging/discharging cycle characteristics. On the other hand, if the content is too large, the obtained all-solid state secondary cell is liable to become higher in internal resistance.

Further, the negative electrode active material layer, like the positive electrode active material layer, may contain, in addition to the above ingredients, a conductivity imparting material, reinforcing material, dispersant, leveling agent, antioxidant, thickening agent, electrolyte breakdown inhibitor, or other ingredients.

As the method for forming the negative electrode active material layer, the method of preparing a negative electrode active material layer slurry which contains a negative electrode active material, inorganic solid electrolyte, particulate-shaped polymer, and organic solvent and a conductivity imparting material or other ingredient which is added according to need, then coating the prepared negative electrode active material layer slurry on the negative electrode-use current collector and drying it etc. may be mentioned.

Note that, as the particulate-shaped polymer, as explained above, it is preferable to use a solution or dispersion of the polymer which is dissolved or dispersed in a nonpolar solvent with a boiling point of 100 to 220° C. In this case, as the organic solvent which is contained in the negative electrode active material layer slurry, use of the above-mentioned nonpolar solvent with a boiling point of 100 to 220° C. is preferable. That is, it is preferable to make the negative electrode active material layer slurry one which contains a negative electrode active material, inorganic solid electrolyte, particulate-shaped polymer, and nonpolar solvent with a boiling point of 100 to 220° C. and a conductivity imparting material or other ingredient which is added according to need.

When preparing the negative electrode active material layer slurry, the method of mixing above-mentioned ingredients is not particularly limited, but, for example, a method using a homogenizer, ball mill, beads mill, planetary mixer, sand mill, roll mill, planetary stirrer, or other dispersing and mixing device may be mentioned. From the viewpoint of being able to suppress aggregation of the negative electrode active material layer and inorganic solid electrolyte, a method which uses a planetary mixer, ball mill, or beads mill is preferable.

The content of the nonpolar solvent with a boiling point of 100 to 220° C. in the negative electrode active material layer slurry is preferably 5 to 70 parts by weight with respect to 100 parts by weight of the total of the negative electrode active material and inorganic solid electrolyte, more preferably 10 to 60 parts by weight, furthermore preferably 20 to 50 parts by weight. If the content of the nonpolar solvent is too small, it sometimes becomes difficult to form a film by a desired thickness. On the other hand, if the content is too large, removal of the solvent is liable to take time.

Further, the negative electrode active material layer slurry may contain, in addition to the above ingredients, in the same way as the above-mentioned solid electrolyte layer slurry, a dispersant, leveling agent, defoamer, or other ingredients. These are not particularly limited so long as not affecting the cell reaction.

(All-Solid State Secondary Cell)

The all-solid state secondary cell of the present invention has the above-mentioned positive electrode active material layer, negative electrode active material layer, and solid electrolyte layer.

In the all-solid state secondary cell of the present invention, the thickness of the solid electrolyte layer is preferably 1 to 15 µm, more preferably 2 to 13 µm, furthermore preferably 3 to 10 µm. By making the thickness of the solid electrolyte layer the above range, it is possible to reduce the internal resistance of the all-solid state secondary cell. If the solid electrolyte layer is too thin in thickness, short-circuits are liable to occur. On the other hand, if the solid electrolyte layer is too thick in thickness, the internal resistance of the all-solid state secondary cell is liable to become larger.

The all-solid state secondary cell of the present invention can be produced by coating the above-mentioned positive electrode active material layer slurry and negative electrode active material layer slurry separately on a current collector and drying these to form a positive electrode active material layer and negative electrode active material layer, coating the solid electrolyte layer slurry on the surface of either the obtained positive electrode active material layer or negative electrode active material layer and drying it to form the solid electrolyte layer, and then bonding the active material layer which is formed with the solid electrolyte layer and the active material layer which is not formed with the solid electrolyte layer through the solid electrolyte layer.

The method of coating the positive electrode active material layer slurry and the negative electrode active material layer slurry on the current collector is not particularly limited. For example, it is coated by the doctor blade method, dipping method, reverse roll method, direct roll method, gravure method, extrusion method, brushing method, etc. Further, the amount of coating of the positive electrode active material layer slurry and negative electrode active material layer slurry is not particularly limited, but the thicknesses of the positive electrode active material layer and negative electrode active material layer which are formed after removal of the solvent should be made amounts of preferably 5 to 300 µm, more preferably 10 to 250 µm. The drying method is not particularly limited, but for example drying by warm air, hot air, or low moisture air, vacuum drying, drying by irradiation of (far) infrared rays or electron beams etc. may be mentioned. The drying temperature is preferably 50 to 250° C., more preferably 80 to 200° C., while the drying time is preferably 10 to 60 minutes in range. Furthermore, the dried positive electrode active material layer and negative electrode active material layer may also be pressed by die pressing or calendar pressing or other method.

The current collector is not particularly limited so long as a material which has electrical conductivity and is electrochemically durable, but from the viewpoint of heat resistance, for example, iron, copper, aluminum, nickel, stainless steel, titanium, tantalum, gold, platinum, and other metal materials are preferable. In particular, for positive electrode use, aluminum is preferably used, while for negative electrode use, copper is preferably used. The shape of the current collector is not particularly limited, but a sheet-shaped one of a thickness of 0.001 to 0.5 mm or so is preferable. The current collector is preferably used after being roughened at its surface so as to raise the adhesion strength of the positive electrode active material layer and the negative electrode active material layer. As the roughening method, the mechanical polishing method, electrolytic polishing method, chemical polishing method, etc. may be mentioned. In the mechanical polishing method, a coated abrasive with abrasive particles fixed to it, a grinding wheel, emery wheel, wire brush provided with steel wire etc., etc. may be mentioned.

Further, when stacking the active material layer which is formed with a solid electrolyte layer and the active material layer which is not formed with a solid electrolyte layer through a solid electrolyte layer, the laminate obtained by stacking these may also be pressed. The pressing method is not particularly limited. For example, a flat press, roll press, CIP (cold isostatic press), etc. may be mentioned. The pressure when pressing is preferably 5 to 700 MPa, more preferably 7 to 500 MPa. By making the pressure of the press the above range, it is possible to reduce the resistance at the interface of the positive electrode active material layer, negative electrode active material layer and the solid electrolyte layer, and further reduce the contact resistance between particles in the layers and therefore possible to improve the cell characteristics.

Note that, when coating the solid electrolyte layer slurry on the surface of either the positive electrode active material layer or the negative electrode active material layer, it is possible to coat either the positive electrode active material layer or negative electrode active material layer, but it is preferable to coat the solid electrolyte layer slurry on the active material layer with the larger particles of the active material used. If the active material is large in particle size, the surface of the active material layer is formed with relief shapes, so by coating the slurry composition, it is possible to reduce the relief shapes on the active material layer surface. For this reason, when stacking and laminating an active material layer which is formed with a solid electrolyte layer and an active material layer which is not formed with a solid electrolyte layer, the contact area between the solid electrolyte layer and the active material layer becomes larger and the resistance at the interface can be suppressed.

Further, the all-solid state secondary cell of the present invention may be rolled up, bent, etc. in accordance with the desired cell shape to be placed in a cell container and sealed. Further, the all-solid state secondary cell of the present invention may in accordance with need have an expander metal, fuse, PTC device, or other overcurrent prevention device, lead plate, etc. attached to it. The shape of the cell may be a coin type, button type, sheet type, cylinder type, square type, flat type, etc.

Note that, the all-solid state secondary cell of the present invention preferably has an amount of moisture in the all-solid state secondary cell of 300 ppm or less, more preferably 200 ppm or less, furthermore preferably 100 ppm or less. If the amount of moisture is too high, due to the action of the water, the inorganic solid electrolyte ends up reacting and the cell characteristics are liable to fall. Note that, in the present invention, by using a nonpolar solvent with a boiling point of 100 to 220° C. as the solvent of the positive electrode active material slurry, negative electrode active material slurry, and solid electrolyte layer slurry which are used for production of the all-solid state secondary cell, it is possible to suitably remove moisture in the production process. Due to this, it is possible to reduce the amount of moisture which is contained in the all-solid state secondary cell.

Further, the all-solid state secondary cell of the present invention contains as a binder the above-mentioned average particle size 30 to 300 nm particulate-shaped polymer. This average particle size 30 to 300 nm particulate-shaped polymer is present in the all-solid state secondary cell (in the positive electrode active material layer, in the negative electrode active material layer, and in the solid electrolyte layer) in a state holding the particulate state. Further, by making it present in the state holding the particulate state, the ingredients which form the all-solid state secondary cell are bonded well without obstructing the ion conduction and electron conduction in an all-solid state secondary cell.

The all-solid state secondary cell of the present invention which are obtained in this way is excellent in rate characteristics and charging/discharging cycle characteristics. For this reason, it may be suitably used for portable information terminals, portable electronic devices, and other portable terminals and also various other applications such as small-size power storage devices for household use, two-wheel motor vehicles, electric vehicles, hybrid electric vehicles, etc.

EXAMPLES

Below, examples and comparative examples will be mentioned to specifically explain the present invention. In the examples, the "parts" and "%" are based on weight unless particularly indicated otherwise. Note that, the definitions of the characteristics and the methods of evaluation are as follows.

<Rate Characteristics>

The secondary cells which were obtained in the examples and comparative examples were charged up to 4.2V by the constant current method assuming a charging rate of 0.1C, then discharged to 3.0V by a discharging rate of 0.1C so as to find the cell capacity at the time of 0.1C discharge. Next, they were charged up to 4.2V by the constant current method assuming a charging rate of 0.1C, then discharged to 3.0V by a discharging rate of 5C so as to find the cell capacity at the time of 5C discharge. Further, similar measurement was performed for 10 cells and the 10 cells were used to find the average values of the cell capacities at the time of 0.1C discharge and 5C discharge and find the ratio (($Cap_{5C}/Cap_{0.1C}$)×100%) of the average value of the cell capacity $Cap_{0.3C}$ at the time of 0.1C discharge and the average value of the cell capacity $Cap_{5C}$ at the time of 5C discharge 5C, that is, the capacity retention rate at 5C discharge. Further, the obtained capacity retention rate at 5C discharge was used as the basis to evaluate the rate characteristics by the following criteria. Note that, the higher the capacity retention rate at 5C discharge, the higher the discharge capacity at the high rate (5C) discharge and the better the rate characteristics can be judged, so this is preferred.

A: Capacity retention rate at 5C discharge of 80% or more

B: Capacity retention rate at 5C discharge of 70% to less than 80%

C: Capacity retention rate at 5C discharge of 50% to less than 70%

D: Capacity retention rate at 5C discharge of 30% to less than 50%

E: Capacity retention rate at 5C discharge of less than 30%

<Charging/Discharging Cycle Characteristics>

The secondary cells which were obtained by the examples and comparative examples, under conditions of temperature 25° C., were charged up to 4.2V by the constant current method assuming a charging rate of 0.1C and discharged by a discharging rate of 0.5C to 3.0V in a charging/discharging test repeatedly for 50 cycles. Further, the ratio (($Cap_{50th}$/$Cap_{1st}$)×100%) of the discharge capacity $Cap_{1st}$ at the first charging/discharging test and the discharge capacity $Cap_{50th}$ at the 50th charging/discharging test, that is, the 50 cycle capacity retention rate, was found. Further, the 50 cycle capacity retention rate was used as the basis to evaluate the charging/discharging cycle characteristics by the following criteria. Note that, the higher the capacity retention rate at 50 cycles, the smaller the deterioration at the 50th cycle at the time of performing the cycle test and the better the charging/discharging cycle characteristics can be judged, so this is preferable.

A: Capacity retention rate at 50 cycles of 60% or more
B: Capacity retention rate at 50 cycles of 55% to less than 60%
C: Capacity retention rate at 50 cycles of 50% to less than 55%
D: Capacity retention rate at 50 cycles of 45% to less than 50%
E: Capacity retention rate at 50 cycles of less than 45%

Example 1

Production of Core-Shell Type Polymer Particles A

To a 50 kgf/cm² pressure resistant autoclave equipped with a stirrer, methyl methacrylate 200 parts, styrene 50 parts, a cross-linkable monomer constituted by divinyl benzene 5 parts, sodium dodecyl benzenesulfonate 10 parts, ion exchanged water 400 parts, and a polymerization initiator constituted by azobis butyronitrile 10 parts were charged. This was sufficiently stirred, then heated to 80° C. for polymerization. Further, after the start of polymerization, when the amount of consumption of the monomer reached 98%, nonylphenoxypolyethyleneglycol acrylate (made by Hitachi Chemical, Functional Acrylate Fancryl "FA-314A") 400 parts, styrene 100 parts, ion exchanged water 800 parts, and a polymerization initiator constituted by azobis butyronitrile 10 parts were added. This was sufficiently mixed and polymerization was performed at 80° C. Further, after the start of polymerization, when the amount of consumption of monomer became 99.8%, the solution was cooled to stop the polymerization reaction to obtain a latex of core-shell type polymer particles A. The obtained latex of core-shell type polymer particles A had a solid content concentration of 39%. Further, the core-shell type polymer particles A had an average particle size of 120 nm. Table 1 shows the difference ($Tg_c$–$Tg_s$) of the glass transition temperature ($Tg_c$) of the core part of the core-shell type polymer particles A and the glass transition temperature ($Tg_s$) of the shell part, the ratio of the core part and shell part in the particles, and the ratio of content of the cross-linkable monomer units constituted by divinyl benzene units in the particles.

Next, decalin 15,000 parts was added to the above obtained latex of core-shell type polymer particles A. This was sufficiently dispersed, then the moisture was removed by drying in vacuo to obtain a decalin dispersion of core-shell type polymer particles A. The obtained dispersion had a solid content concentration of 5%. Note that, the obtained decalin dispersion of the core-shell type polymer particles A was measured for amount of moisture, whereupon it was 72 ppm.

Preparation of Positive Electrode Active Material Layer Slurry

To a stirring tank, a positive electrode active material constituted by lithium cobalt oxide (average particle size: 11.5 µm) 100 parts, inorganic solid electrolyte particles constituted by sulfide glass comprised of $Li_2S$ and $P_2S_5$ ($Li_2S$/$P_2S_5$=70 mol %/30 mol %, average particle size: 5 µm) 150 parts, a conductivity agent constituted by acetylene black 13 parts, and the above obtained binder constituted by a decalin dispersion of core-shell type polymer particles A, 100 parts (converted to solid content, 5 parts) were added. To this, decalin was added to a solid content concentration of 78%. This was mixed by a planetary mixer for 60 minutes, next, decalin was further added to a solid content concentration of 74%, then this was mixed for 10 minutes to obtain a positive electrode active material layer slurry.

Preparation of Negative Electrode Active Material Layer Slurry

To a stirring tank, a negative electrode active material constituted by graphite (average particle size: 20 µm) 100 parts, solid electrolyte particles constituted by sulfide glass comprised of $Li_2S$ and $P_2S_5$ ($Li_2S$/$P_2S_5$=70 mol %/30 mol %, average particle size: 5 µm) 50 parts, and the above obtained binder constituted by a decalin dispersion of core-shell type polymer particles A, 60 parts (converted to solid content, 3 parts) were added. To this, decalin was added to a solid content concentration of 60%. This was mixed by a planetary mixer for 60 minutes to obtain a negative electrode active material layer slurry.

Preparation of Solid Electrolyte Layer Slurry

To a stirring tank, solid electrolyte particles constituted by sulfide glass comprised of $Li_2S$ and $P_2S_5$ ($Li_2S$/$P_2S_5$=70 mol %/30 mol %, average particle size: 5 µm) 100 parts and the above obtained binder constituted by a decalin dispersion of core-shell type polymer particles A, 20 parts (converted to solid content, 1 part) were added. To this, decalin was added to a solid content concentration of 30%. This was mixed by a planetary mixer for 60 minutes to obtain a solid electrolyte layer slurry.

Production of All-Solid State Secondary Cell

An aluminum current collector was coated on the surface with the above obtained positive electrode active material layer slurry and dried at 120° C. for 20 minute to obtain a positive electrode which had a thickness 50 µm positive electrode active material layer. Further, separate from this, a copper current collector was coated on the surface with the above obtained negative electrode active material layer slurry and dried at 120° C. for 20 minutes to obtain a negative electrode which had a thickness 30 µm negative electrode active material layer.

Next, the above obtained positive electrode active material layer of the positive electrode was coated on the surface with the above obtained solid electrolyte layer slurry and dried at 120° C. for 20 minutes to obtain a thickness 11 µm solid electrolyte layer. Further, the solid electrolyte layer which was formed on the surface of the positive electrode active material layer and the negative electrode active material layer of the above obtained negative electrode were stacked and pressed at 10 MPa to obtain an all-solid state secondary cell. Note that, the pressed all-solid state secondary cell had a thickness of the solid electrolyte layer of 9 µm. Further, the obtained all-solid state secondary cell was used to evaluate the rate characteristics and charging/discharging cycle characteristics in accordance with the above methods. The results are shown in Table 1.

Example 2

Except for changing the amount of addition of the sodium dodecyl benzenesulfonate which is used at the time of performing the polymerization from 10 parts to 40 parts, the same procedure was followed as in Example 1 to obtain the decalin dispersion of the core-shell type polymer particles B. The obtained core-shell type polymer particles D had an average particle size of 60 nm. Further, except for using as the binder the obtained decalin dispersion of the core-shell type polymer particles B, the same procedure was followed as in Example 1 to prepare the slurries and produce the all-solid state secondary cell and the same procedure was followed as in Example 1 to evaluate it. The results are shown in Table 1.

Example 3

Except for changing the amount of addition of the sodium dodecyl benzenesulfonate which is used at the time of performing the polymerization from 10 parts to 4 parts, the same procedure was followed as in Example 1 to obtain the decalin dispersion of the core-shell type polymer particles C. The obtained core-shell type polymer particles C had an average particle size of 250 nm. Further, except for using as the binder the obtained decalin dispersion of the core-shell type polymer particles C, the same procedure was followed as in Example 1 to prepare the slurries and produce the all-solid state secondary cell and the same procedure was followed as in Example 1 to evaluate it. The results are shown in Table 1.

Example 4

Except for changing the amount of the decalin dispersion of the core-shell type polymer particles A from 100 parts (converted to solid content, 5 parts) to 350 parts (converted to solid content, 17.5 parts) when preparing the positive electrode active material layer slurry, the same procedure was followed as in Example 1 to prepare the slurries and produce the all-solid state secondary cell and the same procedure was followed as in Example 1 to evaluate it. The results are shown in Table 1.

Example 5

Except for changing the amount of the decalin dispersion of the core-shell type polymer particles A from 60 parts (converted to solid content, 3 parts) to 210 parts (converted to solid content, 10.5 parts) when preparing the negative electrode active material layer slurry, the same procedure was followed as in Example 1 to prepare the slurries and produce the all-solid state secondary cell and the same procedure was followed as in Example 1 to evaluate it. The results are shown in Table 1.

Example 6

To a 50 kgf/cm$^2$ pressure resistant autoclave equipped with a stirrer, methyl methacrylate 200 parts, styrene 150 parts, a cross-linkable monomer constituted by divinyl benzene 5 parts, sodium dodecyl benzenesulfonate 10 parts, ion exchanged water 1200 parts, and a polymerization initiator constituted by azobis butyronitrile 10 parts were charged. The mixture was sufficiently stirred, then was heated to 80° C. to perform the polymerization. Further, after the start of polymerization, when the amount of consumption of the monomer reached 99.8%, the mixture was cooled to stop the polymerization reaction and thereby obtain a latex of the polymer particles D. The obtained latex of the polymer particles D had a solid content concentration of 39%. Note that, polymer particles D are particles which do not have a core-shell structure. Further, the obtained polymer particles D had an average particle size of 190 nm. Next, to the obtained latex of the polymer particles D, decalin: 15,000 parts were added and the particles were sufficiently dispersed. After that, the moisture was removed by drying in vacuo to thereby obtain a decalin dispersion of the polymer particles D. The obtained dispersion had a solid content concentration of 5%.

Further, except for using as the binder the above obtained decalin dispersion of the polymer particles D which do not have the core-shell structure, the same procedure was followed as in Example 1 to prepare the slurries and produce the all-solid state secondary cell and the same procedure was followed as in Example 1 to evaluate it. The results are shown in Table 1.

Example 7

Except for using as the monomer which forms the shell part, instead of the nonylphenoxypolyethyleneglycol acrylate 400 parts, polyethyleneglycol dimethacrylate (Polyethyleneglycol #200 Dimethacrylate (made by Hitachi Chemical, Functional Acrylate Fancryl "FA-220M")) 300 parts, the same procedure was followed as in Example 1 to obtain a decalin dispersion of core-shell type polymer particles E. The obtained core-shell type polymer particles E had an average particle size of 150 nm. Further, except for using as the binder the obtained decalin dispersion of the core-shell type polymer particles E, the same procedure was followed as in Example 1 to prepare the slurries and produce the all-solid state secondary cell and the same procedure was followed as in Example 1 to evaluate it. The results are shown in Table 1.

Example 8

Except for using as the monomer which forms the shell part, instead of the nonylphenoxypolyethyleneglycol acrylate 400 parts, 2-ethylhexyl acrylate 400 parts, the same procedure was followed as in Example 1 to obtain a decalin dispersion of the core-shell type polymer particles F. The obtained core-shell type polymer particles F had an average particle size of 130 nm. Further, except for using as the binder the obtained decalin dispersion of the core-shell type polymer particles F, the same procedure was followed as in Example 1 to prepare the slurries and produce the all-solid state secondary cell and the same procedure was followed as in Example 1 to evaluate it. The results are shown in Table 1.

Example 9

Except for using as the monomer which forms the core part, instead of the methyl methacrylate 200 parts, 2-ethylhexyl acrylate 200 parts, the same procedure was followed as in Example 1 to obtain a decalin dispersion of core-shell type polymer particles G. The obtained core-shell type polymer particles G had an average particle size of 170 nm. Further, except for using as the binder the obtained decalin dispersion of the core-shell type polymer particles G, the same procedure was followed as in Example 1 to prepare the slurries and produce the all-solid state secondary cell and the same procedure was followed as in Example 1 to evaluate it. The results are shown in Table 1.

Example 10

Except for using as the monomer which forms the core part not divinylbenzene, but only methyl methacrylate 200 parts and styrene 50 parts, the same procedure was followed as in Example 1 to obtain a decalin dispersion of the core-shell type polymer particles H. The obtained core-shell type polymer particles H had an average particle size of 120 nm. Further, except for using as the binder the obtained decalin dispersion of the core-shell type polymer particles H, the same procedure was followed as in Example 1 to prepare the slurries and produce the all-solid state secondary cell and the same procedure was followed as in Example 1 to evaluate it. The results are shown in Table 1.

Example 11

Except for using as the solvent which is used for solvent displacement of the latex of the core-shell type polymer particles A, instead of decalin 15,000 parts, xylene 15,000 parts, the same procedure was followed as in Example 1 to obtain a xylene dispersion of the core-shell type polymer particles A. Further, except for using as the binder the obtained xylene dispersion of the core-shell type polymer particles A, the same procedure was followed as in Example 1 to prepare the slurries and produce the all-solid state secondary cell and the same procedure was followed as in Example 1 to evaluate it. The results are shown in Table 1.

Example 12

Except for using as the solvent which is used for solvent displacement of the latex of the core-shell type polymer particles A, instead of decalin 15,000 parts, toluene 15,000 parts, the same procedure was followed as in Example 1 to obtain a toluene dispersion of the core-shell type polymer particles A. Further, except for using as the binder the obtained toluene dispersion of the core-shell type polymer particles A, the same procedure was followed as in Example 1 to prepare the slurries and produce the all-solid state secondary cell and the same procedure was followed as in Example 1 to evaluate it. The results are shown in Table 1.

Comparative Example 1

To a 50 kgf/cm$^2$ pressure resistant autoclave equipped with a stirrer, methyl acrylate 100 parts, n-butyl acrylate 100 parts, acrylonitrile 30 parts, decalin 400 parts and a polymerization initiator constituted by benzoyl peroxide 0.1 part were charged. The mixture was held at 80° C. for 5 hours for solution polymerization to obtain a decalin solution of the methyl acrylate-n-butyl acrylate-acrylonitrile copolymer I. Note that, the obtained methyl acrylate-n-butyl acrylate-acrylonitrile copolymer I dissolved in the decalin and did not have a particulate shape. Next, decalin was added to the obtained solution to adjust it to a solid content concentration 5% and a molecular sieve was used for dehydration.

Further, except for using as the binder the above obtained decalin solution of the methyl acrylate-n-butyl acrylate-acrylonitrile copolymer I which was dehydrated, the same procedure was followed as in Example 1 to prepare the slurries and produce the all-solid state secondary cell and the same procedure was followed as in Example 1 to evaluate it. The results are shown in Table 1.

Comparative Example 2

Except for changing the amount of the styrene from 150 parts to 100 parts and not using sodium dodecyl benzenesulfonate when performing the polymerization, the same procedure was followed as in Example 6 to obtain a decalin dispersion of the polymer particles J which do not have a core-shell structure. The obtained polymer particles J had an average particle size of 500 nm. Further, except for using the obtained decalin dispersion of polymer particles J not having a core-shell structure, the same procedure was followed as in Example 1 to prepare the slurries and produce the all-solid state secondary cell and the same procedure was followed as in Example 1 to evaluate it. The results are shown in Table 1.

TABLE 1

| | | Examples | | | | | | |
|---|---|---|---|---|---|---|---|---|
| | | 1 | 2 | 3 | 4 | 5 | 6 | 7 |
| Binder | | | | | | | | |
| Shape | | Particles | Particles | Particles | Particles | Particles | Particles | Particles |
| Average particle size | (nm) | 120 | 60 | 250 | 120 | 120 | 190 | 150 |
| Monomer units of core part | | | | | | | | |
| Divinylbenzene | (%) | 1.96 | 1.96 | 1.96 | 1.96 | 1.96 | 1.4 | 1.96 |
| Methyl methacrylate | (%) | 78.44 | 78.44 | 78.44 | 78.44 | 78.44 | 56.3 | 78.44 |
| 2-ethylhexyl acrylate | (%) | — | — | — | — | — | — | — |
| Styrene | (%) | 19.6 | 19.6 | 19.6 | 19.6 | 19.6 | 42.3 | 19.6 |
| Monomer units of shell part | | | | | | | | |
| Nonylphenoxy polyethyleneglycol acrylate | (%) | 80 | 80 | 80 | 80 | 80 | — | — |
| Polyethyleneglycol dimethacrylate | (%) | — | — | — | — | — | — | 75 |
| 2-ethylhexyl acrylate | (%) | — | — | — | — | — | — | — |
| Styrene | (%) | 20 | 20 | 20 | 20 | 20 | — | 25 |
| Tg difference ($Tg_c - Tg_s$) | (° C.) | 141 | 141 | 141 | 141 | 141 | — | 133 |
| Glass transition temperature of core part ($Tg_c$) | (° C.) | 106 | 106 | 106 | 106 | 106 | — | 106 |
| Ratio of core part in particles | (%) | 33 | 32 | 34 | 33 | 33 | 100 | 38 |
| Ratio of shell part in particles | (%) | 67 | 68 | 66 | 67 | 67 | — | 62 |
| Ratio of content of divinylbenzene in particles | (%) | 0.6 | 0.6 | 0.7 | 0.6 | 0.6 | 1.4 | 0.8 |
| Solvent used for production of slurry | | Decalin | Decalin | Decalin | Decalin | Decalin | Decalin | Decalin |
| Content of binder in positive electrode active material layer | (part) | 2 | 2 | 2 | 7 | 2 | 2 | 2 |

TABLE 1-continued

|  |  | | | | | | | |
|---|---|---|---|---|---|---|---|---|
| Content of binder in negative electrode active material layer | (part) | 2 | 2 | 2 | 2 | 7 | 2 | 2 |
| Content of binder in solid electrolyte layer | (part) | 1 | 1 | 1 | 1 | 1 | 1 | 1 |
| Water content of solvent dispersion of binder | (ppm) | 72 | 81 | 65 | 74 | 80 | 90 | 74 |
| Evaluation |  |  |  |  |  |  |  |  |
| Rate characteristics |  | A | B | C | C | C | C | A |
| Charging/discharging cycle characteristics |  | A | A | C | B | B | C | A |

|  |  | Examples | | | | | Comp. ex. | |
|---|---|---|---|---|---|---|---|---|
|  |  | 8 | 9 | 10 | 11 | 12 | 1 | 2 |
| Binder |  |  |  |  |  |  |  |  |
| Shape |  | Particles | Particles | Particles | Particless | Particles | non-Particles | Particles |
| Average particle size | (nm) | 130 | 170 | 120 | 120 | 120 | — | 500 |
| Monomer units of core part |  |  |  |  |  |  |  |  |
| Divinylbenzene | (%) | 1.96 | 1.96 | — | 1.96 | 1.96 | — | 1.64 |
| Methyl methacrylate | (%) | 78.44 | — | 80 | 78.44 | 78.44 | — | 65.58 |
| 2-ethylhexyl acrylate | (%) | — | 78.44 | — | — | — | — | — |
| Styrene | (%) | 19.6 | 19.6 | 20 | 19.6 | 19.6 | — | 32.78 |
| Monomer units of shell part |  |  |  |  |  |  |  |  |
| Nonylphenoxy polyethyleneglycol acrylate | (%) | — | 80 | 80 | 80 | 80 | — | — |
| Polyethyleneglycol dimethacrylate | (%) | — | — | — | — | — | — | — |
| 2-ethylhexyl acrylate | (%) | 80 | — | — | — | — | — | — |
| Styrene | (%) | 20 | 20 | 20 | 20 | 20 | — | — |
| Tg difference ($Tg_c - Tg_s$) | (° C.) | 123 | 23 | 140 | 141 | 141 | — | — |
| Glass transition temperature of core part ($Tg_c$) | (° C.) | 106 | −13 | 104 | 106 | 106 | — | — |
| Ratio of core part in particles | (%) | 33 | 33 | 33 | 33 | 33 | — | — |
| Ratio of shell part in particles | (%) | 67 | 67 | 67 | 67 | 67 | — | — |
| Ratio of content of divinylbenzene in particles | (%) | 0.7 | 0.7 | 0 | 0.6 | 0.6 | — | — |
| Solvent used for production of slurry |  | Decalin | Decalin | Decalin | Xylene | Toluene | Decalin | Decalin |
| Content of binder in positive electrode active material layer | (part) | 2 | 2 | 2 | 2 | 2 | 2 | 2 |
| Content of binder in negative electrode active material layer | (part) | 2 | 2 | 2 | 2 | 2 | 2 | 2 |
| Content of binder in solid electrolyte layer | (part) | 1 | 1 | 1 | 1 | 1 | 1 | 1 |
| Water content of solvent dispersion of binder | (ppm) | 80 | 74 | 81 | 95 | 421 | 71 | 86 |
| Evaluation |  |  |  |  |  |  |  |  |
| Rate characteristics |  | B | B | C | A | B | D | E |
| Charging/discharging cycle characteristics |  | C | B | B | B | C | E | E |

In Table 1, the content of the binder in the positive electrode active material layer shows the content when defining the total of the positive electrode active material and the inorganic solid electrolyte particles as 100 parts. Further, the content of the binder in the negative electrode active material layer shows the content when defining the total of the negative electrode active material and the inorganic solid electrolyte particles as 100 parts. Furthermore, the content of the binder in the solid electrolyte layer shows the content when defining the inorganic solid electrolyte particles as 100 parts.

As shown in Table 1, when using as the binder an average particle size 30 to 300 nm particulate-shaped polymer, the obtained all-solid state secondary cell was excellent in rate characteristics and charging/discharging cycle characteristics (Example 1 to 12). Further, when using as the binder an average particle size 30 to 300 nm particulate-shaped polymer, the particulate-shaped polymer was present in the all-solid state secondary cell (in the positive electrode active material layer, in the negative electrode active material layer, and in the solid electrolyte layer), it was present in a state holding the particulate shape in each case.

On the other hand, when using as the binder a polymer which is not particulate shaped, the binder ended up covering the positive electrode active material particles, negative electrode active material particles, and solid electrolyte particles, the electron conductivity and ion conductivity were obstructed, the obtained all-solid state secondary cell became inferior in rate characteristics and charging/discharging cycle characteristics (Comparative Example 1).

Similarly, when using as the binder an average particle size 500 nm particulate-shaped polymer, in the positive electrode active material particles, negative electrode active material particles, and solid electrolyte particles which form the all-solid state secondary cell, the distance between the particles ends up becoming larger and the obtained all-solid state secondary cell became inferior in rate characteristics and charging/discharging cycle characteristics (Comparative Example 2).

The invention claimed is:

1. An all-solid state secondary cell which has a positive electrode active material layer, negative electrode active material layer, and solid electrolyte layer, wherein
    at least one of said positive electrode active material layer, said negative electrode active material layer, and said solid electrolyte layer includes an inorganic solid electrolyte and a binder comprised of an average particle size 30 to 300 nm particulate-shaped polymer and
    said particulate-shaped polymer is present in said positive electrode active material layer, said negative electrode active material layer, and said solid electrolyte layer in a state holding the particulate state.

2. The all-solid state secondary cell as set forth in claim 1, wherein said particulate-shaped polymer has a core-shell structure.

3. The all-solid state secondary cell as set forth in claim 2, wherein the shell part of said particulate-shaped polymer is comprised of a polymer which has (meth)acrylic acid ester monomer units containing an ethyleneoxide structure.

4. The all-solid state secondary cell as set forth in claim 2, wherein the core part of said particulate-shaped polymer is comprised of a polymer which has cross-linkable monomer units.

5. The all-solid state secondary cell as set forth in claim 2, wherein the ratio of the core part and shell part of said particulate-shaped polymer is, by weight ratio of "core part:shell part", 70:30 to 10:90.

6. The all-solid state secondary cell as set forth in claim 2, wherein a difference ($Tg_c-Tg_s$) between a glass transition temperature ($Tg_c$) of the core part of the said particulate-shaped polymer and a glass transition temperature ($Tg_s$) of the shell parts is 30° C. or more.

7. The all-solid state secondary cell as set forth in claim 1, wherein said inorganic solid electrolyte is sulfide glass which contains Li, P, and S and/or a sulfide glass ceramic which contains Li, P, and S.

* * * * *